(12) United States Patent
Christidis et al.

(10) Patent No.: US 11,663,609 B2
(45) Date of Patent: May 30, 2023

(54) METHOD AND APPARATUS TO ENFORCE SMART CONTRACT EXECUTION HIERARCHY ON BLOCKCHAIN

(71) Applicant: International Business Machines Corporation, Armonk, NY (US)

(72) Inventors: Konstantinos Christidis, Durham, NC (US); Anna D. Derbakova, Durham, NC (US); Nitin Gaur, Austin, TX (US); Praveen Jayachandran, Bangalore (IN); Srinivasan Muralidharan, Resaerch Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 1059 days.

(21) Appl. No.: 15/284,814

(22) Filed: Oct. 4, 2016

(65) Prior Publication Data

US 2018/0096360 A1    Apr. 5, 2018

(51) Int. Cl.
*H04L 9/06*    (2006.01)
*G06Q 20/02*    (2012.01)
(Continued)

(52) U.S. Cl.
CPC .......... *G06Q 30/018* (2013.01); *G06Q 20/02* (2013.01); *H04L 9/0643* (2013.01);
(Continued)

(58) Field of Classification Search
CPC .................. G06Q 30/018; G06Q 30/01; H04L 9/06–069; H04L 9/32–329
(Continued)

(56) References Cited

U.S. PATENT DOCUMENTS 6,477,513 B1 *  11/2002  Walker ................. G06Q 20/401
                                                          705/76
2003/0110062 A1 *  6/2003  Mogler ................. G06Q 10/10
                                                          705/5

(Continued)

OTHER PUBLICATIONS

How Computers Work 7th Ed (Year: 2004).*
(Continued)

*Primary Examiner* — Zeshan Qayyum
*Assistant Examiner* — Cristina Owen Sherr
(74) *Attorney, Agent, or Firm* — Scully. Scott, Murphy & Presser. P.C.; Jared L. Montanaro

(57) ABSTRACT

The present disclosure relates to the enforcement of a smart contract execution hierarchy on a blockchain. A method includes receiving a submission of a first smart contract to be appended to a blockchain, comparing a priority value of the first smart contract to a priority value of a second smart contract previously appended to the blockchain, determining based on the comparison that the first smart contract has a lower priority than the second smart contract, comparing the terms of the first smart contract to the terms of the second smart contract, determining at least one of an overlap and a conflict between the terms of the first smart contract and the terms of the second smart contract, resolving any terms of the first smart contract that are determined to overlap or conflict with the terms of the second smart contract, and appending the resolved first smart contract to the blockchain.

17 Claims, 6 Drawing Sheets

(51) Int. Cl.
*G06Q 30/018* (2023.01)
*H04L 9/32* (2006.01)
*G06Q 20/10* (2012.01)
*H04L 9/00* (2022.01)

(52) U.S. Cl.
CPC ....... *H04L 9/3239* (2013.01); *G06Q 2220/00* (2013.01); *H04L 9/50* (2022.05)

(58) Field of Classification Search
USPC .......................................................... 705/50
See application file for complete search history.

(56) References Cited

U.S. PATENT DOCUMENTS

| | | | |
|---|---|---|---|
| 2003/0195878 A1* | 10/2003 | Neumann | G06F 16/217 |
| 2015/0220928 A1 | 8/2015 | Allen | |
| 2015/0379510 A1 | 12/2015 | Smith | |
| 2016/0028552 A1 | 1/2016 | Spanos et al. | |
| 2016/0275059 A1* | 9/2016 | Taparia | G06F 40/169 |
| 2017/0011460 A1* | 1/2017 | Molinari | G06Q 40/06 |
| 2017/0054736 A1* | 2/2017 | Krishnamurthy | G06F 21/6209 |
| 2017/0236120 A1* | 8/2017 | Herlihy | H04L 9/3236 705/67 |
| 2017/0300872 A1* | 10/2017 | Brown | G06Q 40/12 |
| 2017/0300873 A1* | 10/2017 | Krishna | G06Q 20/023 |
| 2017/0345011 A1* | 11/2017 | Salami | G06Q 20/42 |
| 2018/0089638 A1* | 3/2018 | Christidis | G06Q 20/3827 |

OTHER PUBLICATIONS

White, How Computers Work 7th Ed, p. 4 (Year: 2003).*
Campell Pryde, "Smart Contracts, Blockchain and Data Standards", XBRL US Meeting Hosted by Baruch College, Apr. 4, 2016, pp. 1-121.

* cited by examiner

METHOD AND APPARATUS TO ENFORCE SMART CONTRACT EXECUTION HIERARCHY ON BLOCKCHAIN

TECHNICAL FIELD

The present disclosure relates to blockchains and in particular to enforcing a smart contract execution hierarchy on a blockchain.

BACKGROUND

Blockchain technology was developed as a way of providing a publicly transparent and decentralized ledger that is configured to track and store digital transactions in a publicly verifiable, secure, and hardened manner to prevent tampering or revision.

A typical blockchain includes three primary functions: read, write, and validate. For example, a user of the blockchain must have the ability to read the data that resides on the blockchain. A user of the blockchain must also have the ability to write, e.g. append, data to the blockchain. Every write operation starts out as a proposed transaction that is posted on the network. The proposed transaction may not always be valid, for example, it may be malformed (syntax errors), or it may constitute an attempt to perform a task for which the submitter is not authorized. Validation refers to filtering out invalid transactions and then deciding on the exact order for the remaining, valid, transactions to be appended to the blockchain as part of a new block.

Once ordered, the transactions are packaged into a new block, and the new block is voted on by the validator nodes associated with the blockchain to determine whether to add the new block to the blockchain. If a consensus to add the new block is reached, e.g., a threshold number of "for" votes, the new block may be appended to the blockchain. Each new block that is appended to the blockchain also includes a hash of the previous block. Accordingly, as each new block is added, the security and integrity of the entire blockchain is further enhanced. It is important to note that once data is written to the blockchain, for example, once a block including a set of transactions has been appended to the blockchain, that data can no longer be altered or modified. In a typical blockchain, the anonymity of the users is protected through the use of pseudonyms and the transaction data itself is protected through the use of cryptography, e.g., via the use of hash codes.

Recently, the use of blockchain technology has expanded beyond crypto currency, to provide a framework for the execution of smart contracts. Smart contracts are self executing agreements between parties that have all of the relevant covenants spelled out in code, and settle automatically, depending on future signatures or trigger events. By leveraging blockchain technologies, smart contracts, once appended to the blockchain, cannot be revoked, denied, or reversed, since decentralized execution removes them from the control of any one party.

BRIEF SUMMARY

The system, method, and computer program product described herein provide enforcement of a smart contract execution hierarchy on a blockchain.

In an aspect of the present disclosure, a method is disclosed. The method includes receiving a submission of a first smart contract to be appended to a blockchain. The first smart contract includes a value corresponding to a priority of the first smart contract. The method further includes comparing the value of the first smart contract to a value corresponding to a priority of a second smart contract previously appended to the blockchain, determining based on the comparison that the first smart contract has a lower priority than the second smart contract, in response to determining that the first smart contract has a lower priority than the second smart contract, comparing the terms of the first smart contract to the terms of the second smart contract, determining at least one of an overlap and a conflict between the terms of the first smart contract and the terms of the second smart contract based on the comparison of the terms, resolving any terms of the first smart contract that are determined to overlap or conflict with the terms of the second smart contract, and appending the resolved first smart contract to the blockchain.

In aspects of the present disclosure apparatus, systems, and computer program products in accordance with the above aspect may also be provided.

BRIEF DESCRIPTION OF THE DRAWINGS

The details of the present disclosure, both as to its structure and operation, can best be understood by referring to the accompanying drawings, in which like reference numbers and designations refer to like elements.

DETAILED DESCRIPTION

Figure 1:
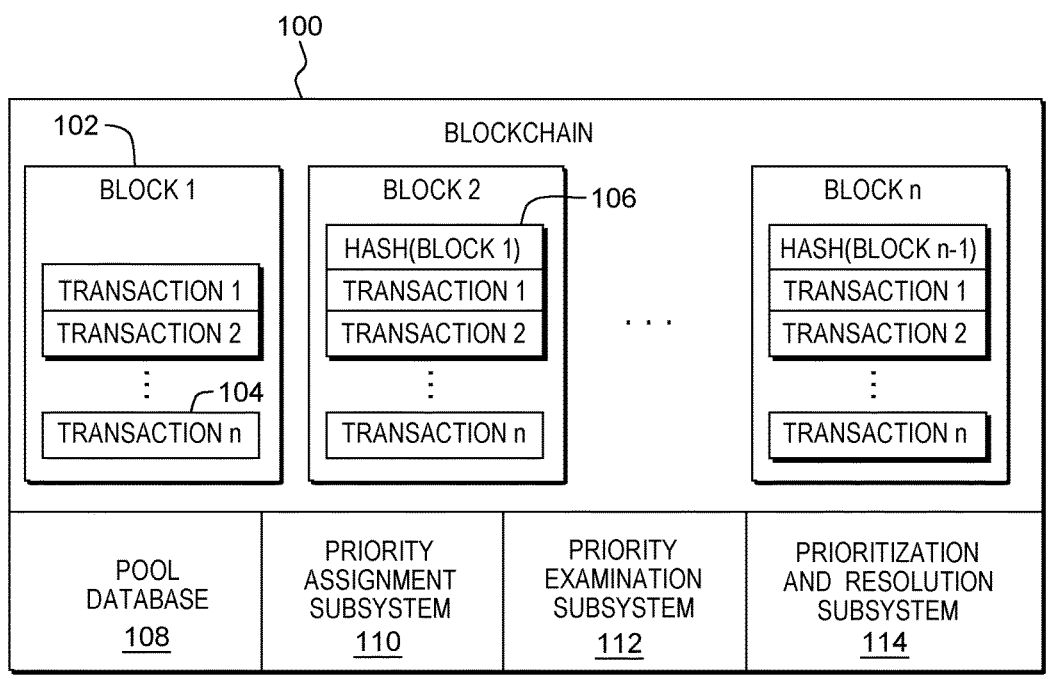
FIG. 1 is a system diagram illustrating a blockchain in accordance with an aspect of the present disclosure.

Often transactions and contracts between businesses or other entities may be required to meet certain regulatory requirements, enterprise level requirements, business unit level requirements, guidance, or best practices. For example, transactions and contracts often must comply with international, federal and local laws, enterprise and business practices or requirements, or other similar requirements. In some aspects, for example, an enterprise may require all new contracts with a particular entity to comply with the terms of a prior contract between the enterprise and the entity. When transactions and contracts (e.g., smart contracts) are deployed and executed on various blockchains associated with the enterprise, a mechanism for checking and enforcing these requirements may be necessary. For example, smart contracts deployed on a blockchain are often very nuclear, e.g., self-oriented, and have little to no visibility into the larger eco system of smart contracts residing on various blockchains associated with the enterprise. This may lead to an array of smart contracts for the enterprise having terms that potentially overlap or even conflict with each other on the various blockchains associated with the enterprise.

In some aspects, a transaction and smart contract hierarchy may be employed to satisfy these requirements. Such a smart contract hierarchy may provide for an automated, distributed regulation of smart contracts, a pre-execution verification of requirements rather than post-facto lawsuits, a standardization of contracts, checks for anti-collusion, anti-monopoly, or other regulations, and other similar uses.

In some aspects, for example, each transaction and smart contract submitted for addition to a blockchain may include or may be assigned a priority level, e.g., 0, 1, 2, 3, 4, etc. In some aspects, for example, a priority value of 0 may correspond to the highest priority, a priority level of 1 may correspond to the next highest priority, etc. In some aspects, for example, the higher the priority level is, the higher the priority, e.g., a priority level of 5 may correspond to the highest priority, a priority level of 4 may correspond to the next highest priority, a priority level of 0 may correspond to the lowest priority, etc.

In some aspects, for example, an enterprise may employ a master smart contract, e.g., a smart contract having the highest priority, e.g., priority level 0, to govern all other contracts entered into by the enterprise. The master smart contract may be added to one or more of the blockchains and may be referenced by all new transactions and smart contracts that are later submitted for addition to the blockchains. For example, validator nodes associated with the blockchains may verify that any new transactions or smart contracts of the enterprise that are submitted for addition to any of the blockchains associated with the enterprise comply with the terms of the master smart contract associated with the enterprise. In some aspects, the master smart contract for an enterprise may be appended as part of a genesis block, e.g., first block, of the blockchain. In some aspects, the master smart contract may be designated as an immutable master smart contract. An immutable master smart contract requires that all transactions and smart contracts subsequently submitted for addition to the blockchain must comply with the terms of the immutable master contract regardless of priority level. For example, even where a new smart contract including the same priority level as the master smart contract, e.g., a priority level of 0, is subsequently added to the blockchain, the terms of the new smart contract must still comply with the terms of the immutable master smart contract. In other words, a priority conflict between the immutable master contract and a new smart contract may always be resolved in favor of the immutable master smart contract.

In some aspects, the terms of the master smart contract may be executed by the validator nodes associated with the blockchain each time a new transaction or smart contract is submitted for addition to the blockchain. For example, a master smart contract of an enterprise, e.g., a smart contract with the highest priority, may include a term that specifies that new transactions or smart contracts may not be executed between business units of an enterprise and a particular supplier. This term may be included in the master smart contract, for example, due to prior negative history between the enterprise and the particular supplier. When new transactions or smart contracts are submitted to the validator nodes for addition to the blockchain, the validator nodes may execute the term of the master smart contract, e.g., the prohibition on transactions or smart contracts between the enterprise and the particular supplier, to determine whether or not any of the new transactions or smart contracts includes a term that is associated with the particular supplier. If the validator nodes determine that the new transaction or smart contract includes a term that is associated with the particular supplier, all or part of the new transaction or smart contract may be denied entry to the blockchain by the validator nodes in accordance with the master smart contract. For example, the new transaction or smart contract may be modified by the validator nodes by removing the conflicting or overlapping terms prior to the new transaction or smart contract being appended to the blockchain. In some aspects, a new transaction or smart contract that includes terms that conflict or overlap with the master smart contract may be denied addition to the blockchain.

In some aspects, for example, a conflict between terms may occur when a term in a new transaction or smart contract is directed toward the same object as a term found in a prior higher priority smart contract. For example, the term in the new transaction or smart contract may have a different value than a term in the prior smart contract which causes a conflict. For example, a conflict may be determined to have occurred, e.g., by the validator node, when a prior smart contract having a higher priority, e.g., a priority level of 0, includes a term that an interest rate of 8% should be applied to a particular business object, e.g., a mortgage, and a new smart contract having a lower priority, e.g., a priority level of 1, includes a term that an interest rate of 16% should be applied to the particular business object. In this case, the 8% and 16% terms conflict and will be resolved based on the priority, e.g., in favor of the prior smart contract that has the higher priority.

In some aspects, for example, an overlap between terms may occur when a new transaction or smart contract includes a term that is the same as a term found in a prior smart contract that has a higher priority than the transaction or smart contract. For example, an overlap may occur when any number of new transactions or smart contracts, e.g., three new smart contracts with priority levels of 2, 4, and 6, include an terms that is the same as the term of the higher priority prior smart contract, e.g., having a priority level of 0. For example, if each of the new smart contracts includes a term that an interest rate 8% should be applied to the particular business object and the higher priority prior smart contract also includes a term than an 8% interest rate should be applied to the particular business object, may be determined to have occurred, for example, by the validator nodes. The overlap may be resolved, for example, by nullifying the overlap, e.g., removing the terms from the new transactions and smart contracts that overlap so that only one instance of the overlapping term is present, i.e., in the higher priority smart contract.

As another example, the master smart contract may include a regulatory or legal term that must be complied with by the enterprise. For example, the master smart contract may include a term requiring that all supplier contracts for a particular food, e.g., beef, must include a term specifying that the particular food is grown or raised in a particular manner, e.g., free range, no pesticides, specific types of feeding or fertilizer, etc. When a new smart contract associated with a supplier of the particular food is submitted to the validator nodes for execution on the blockchain, the regulatory term may be executed by the validator nodes to determine whether or not the new smart contract includes the appropriate terms to comply with the regulatory requirements specified by the master smart contract.

In some aspects, the master smart contract may enable verification that any new transactions or smart contracts do not violate any laws when taken together with previously deployed contracts (e.g., anti-collusion laws, anti-monopoly laws) where each contract taken individually may pass regulations, but taken together the contracts may violate certain laws. By including terms or requirements about the laws in the master smart contract, the master smart contract may prevent or reduce the occurrence of such violations of the laws or regulation for transactions and smart contracts that have been appended to the blockchain. For example, the validator nodes may maintain a pool of smart contracts, priorities, and terms (FIG. 5) for later use in making comparisons to laws that may affect a combination of transactions or smart contracts deployed on the blockchain. As each new transaction or smart contract is submitted to the validator nodes for addition to the blockchain, the terms of the new transaction or smart contract may be compared directly to the terms of the master smart contract by the validator nodes and in addition, may be compared to the terms of the master smart contract in combination with other transactions or smart contracts that were previously deployed on the blockchain.

In some aspects, the validator nodes may verify that any new transactions or smart contracts submitted for addition to the blockchain comply with the terms of any prior transactions or smart contracts that have a higher priority. For example, if a new smart contract is submitted for addition to a blockchain with a priority level of 3 (where, for example, the highest priority is priority level 0), the new smart contract may be required by the validator nodes to comply, or at least not overlap or conflict, with the terms of every other transaction or smart contract having a higher priority, e.g., all transactions or smart contracts having a priority level of 0, 1, or 2. For example, the validator nodes may compare the terms of the new transaction or smart contract to the requirements or terms of the master contract or any other contract having higher priority to determine if there is an overlap or conflict. For example, depending on how the transactions and smart contracts are formatted, a comparison may be performed as a simple difference or through the use of syntax or string analysis. In some aspects, for example, each smart contract may be defined according to a specific smart contract description language that includes common classes, headers, or other features that may be used by validator nodes to determine whether there is an overlap or conflict in the terms. In some aspects, for example, the comparison and determination of whether there is an overlap or conflict between new transactions or smart contracts and higher priority transactions, smart contracts or master contracts of the enterprise may be performed by a computing resource other than the validator nodes thereby preserving the processing power of the validator nodes for generating new blocks and achieving consensus.

In some aspects, a new transaction or smart contract that is submitted for addition to the blockchain may include terms that overlap or conflict with terms of a smart contract that was previously added to the blockchain where both the new transaction or smart contract and the previously added smart contract both have the same priority. In some aspects, the new contract may have priority over the previously appended smart contract when the new and previously appended smart contracts have the same priority level. In some aspects, the new transaction or smart contract may be appended to the blockchain without any modification or adjustment.

With reference now to FIG. 1, a blockchain 100 includes a plurality of blocks 102. Each block 102 is a data structure that includes data representing transactions 104, for example, smart contracts, payment receipts, or any other transaction. As described above, as new transactions 104 are submitted to the blockchain 100 and validated, additional blocks 102 are generated and appended to the blockchain 100. Each new block 102 also includes a hash 106 of the immediately previous block 102. For example, block 2 includes a hash of block 1, block n includes a hash of block n−1, etc. In some aspects, blockchain 100 may include or be associated with one or more of a priority assignment subsystem 110, a priority examination subsystem 112, and a prioritization and resolution subsystem 114 as described in more detail below.

Figure 2:
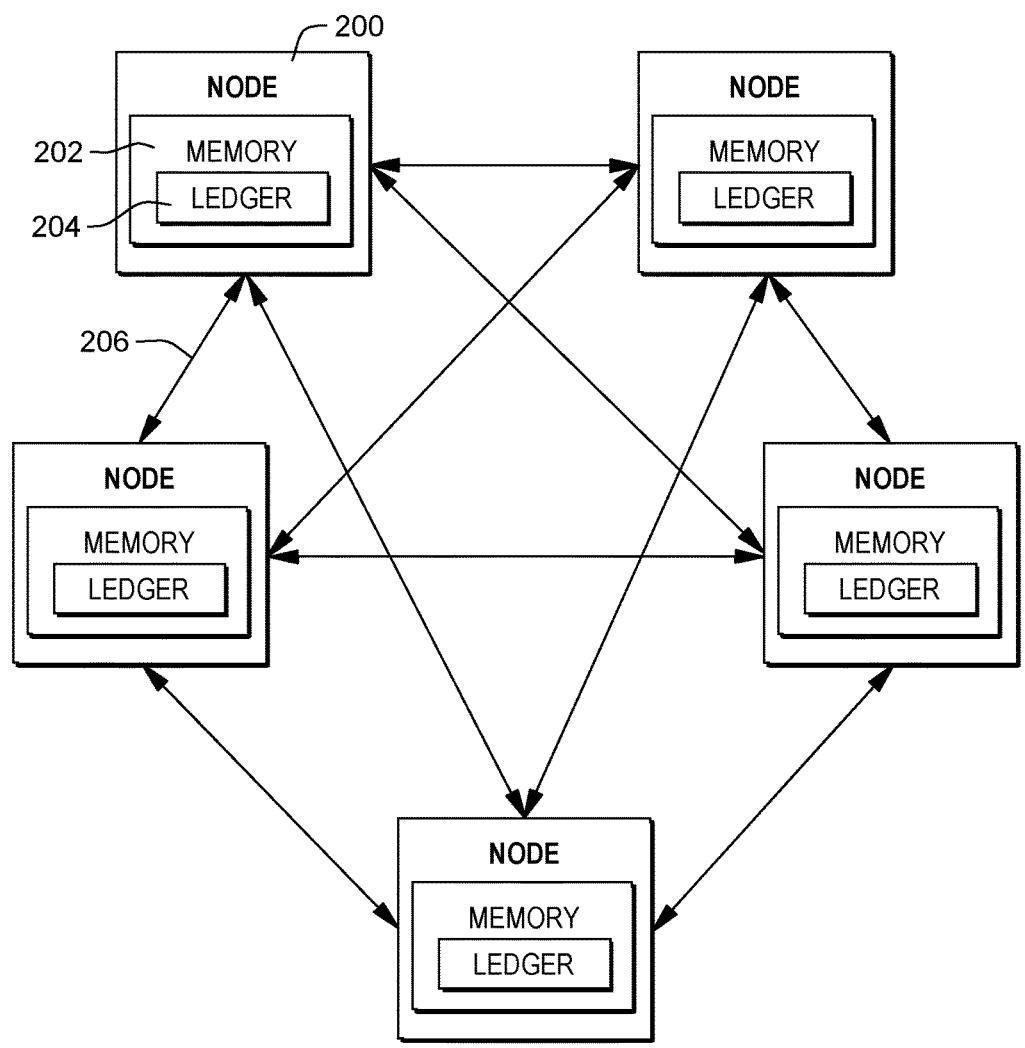
FIG. 2 is a system diagram illustrating nodes associated with the blockchain of FIG. 1 and storing the ledger of the blockchain of FIG. 1 in accordance with an aspect of the present disclosure.

With reference now to FIG. 2, in some aspects, blockchain 100 is stored in a decentralized manner on a plurality of nodes 200, e.g., computing devices located in one or more networks. Nodes 200 may each include a memory 202 that stores at least a portion of a ledger 204 of blockchain 100. Ledger 204 includes any data blocks 102 that have been validated and added to the blockchain 100. In some aspects, every node 200 may store the entire ledger 204. In some aspects, each node 200 may store a portion of ledger 204. In some aspects, some or all of blockchain 100 may be stored in a centralized manner. Nodes 200 may communicate with one another via communication pathways 206, e.g., wired or wireless connections, over the internet, etc. to transmit and receive data related to ledger 204. For example, as new data blocks 102 are added to ledger 204, nodes 200 may communicate or share the new data blocks 102 via communication pathways 206.

Figure 3:
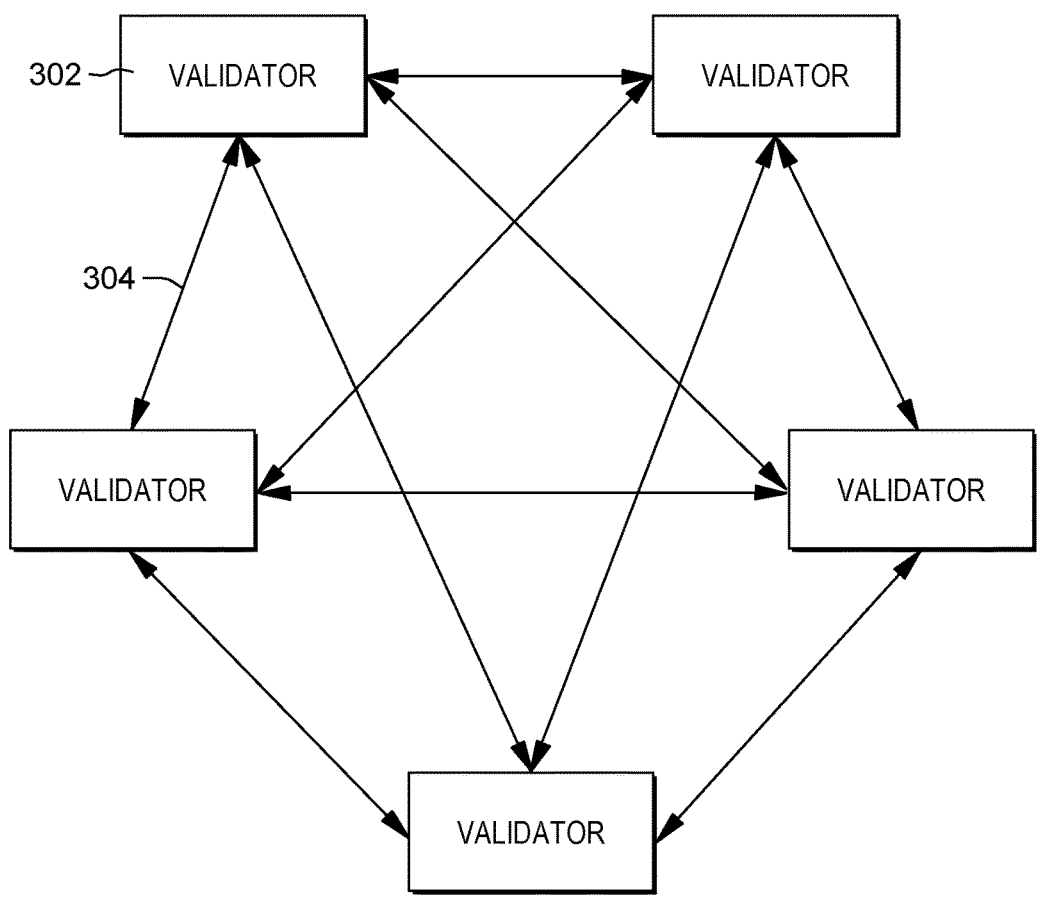
FIG. 3 is a system diagram illustrating validator nodes associated with the blockchain of FIG. 1 in accordance with an aspect of the present disclosure.

With reference now to FIG. 3, any transactions 104 submitted to blockchain 100 are validated by a set of validator nodes 300 associated with blockchain 100. For example, transactions 104 may be transmitted to one or more of the validator nodes 300 and may be shared between the validator nodes 300 for validation and consensus. Each validator node 302 determines whether a transaction 104 is valid and whether the transaction 104 complies with the rules of the blockchain 100. The validator node 302 adds a plurality of the validated transactions 104 to a data block 102 and submits the data block 102 for consensus by all or some of the other validator nodes. The other validator nodes 302 then vote "for" or "against" appending the data block 102 containing the transactions 104 to the blockchain 100. A consensus of the set of validator nodes 300, e.g., a threshold number of identical votes "for" or "against", is required to allow or deny the data block 102 to be appended to the blockchain 100. In some aspects, one or more of nodes 200 may also be validator nodes 302. In some aspects, nodes 200 that are not validator nodes 302 may perform processing such as, for example, receiving transaction submissions, providing member services, delivering events to applications, handling application programming interface (API) requests from users, or other similar functions. In this manner, the processing power of the validator nodes 302 may be preserved for generating new blocks, reaching consensus, and monitoring the other validator nodes 302. Validator nodes 302 may communicate with one another via communication pathways 304, e.g., wired or wireless connections, over the internet, etc., to transmit and receive data. For example, as new data blocks 102 are generated by validator nodes 302, validator nodes 302 may communicate or share the new data blocks 102 and transmit and receive consensus messages via communication pathways 304.

Figure 4:
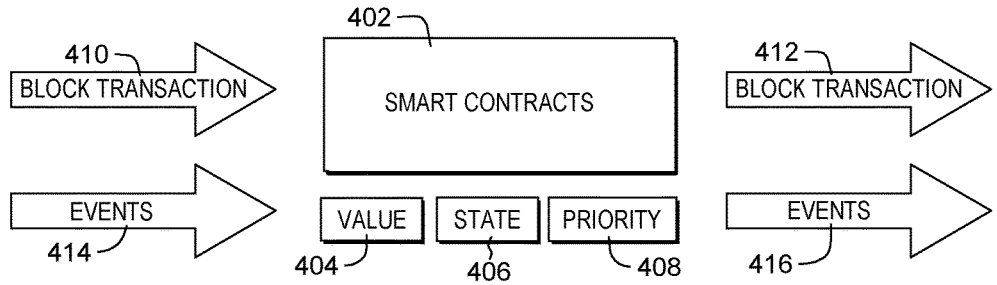
FIG. 4 is a diagram illustrating a smart contract including a priority level in accordance with an aspect of the present disclosure.

With reference now to FIG. 4, an example smart contract 402 is illustrated including a value 404 (e.g., a numerical value, monetary value, or any other value), a state 406 of the smart contract (e.g., a number of items of a product sold in all retail outlets of a firm, or other similar information that may be dependent on other sources), and a priority level 408, e.g., 0, 1, 2, 3, 4, . . . , n. In some aspects, smart contract 402 may receive value 404 from a transaction in a block 410, or aggregated from multiple transactions in a block 410, and the value 404 may be sent to another smart contract via a transaction 412. Smart contract 402 may also receive information about the state 406 from an event 414, or aggregated from multiple events 414, and the state 406 may be sent as an event 416 to another smart contract. Priority level 408 may be compared to the priority level of other smart contracts or transactions to determine a hierarchy of smart contracts on the blockchain. For example, the priority level 408 may be checked against the priority level of other smart contracts or transactions to determine whether there are any higher priority smart contracts or transactions whose terms must be complied with by smart contract 402.

Figure 5:
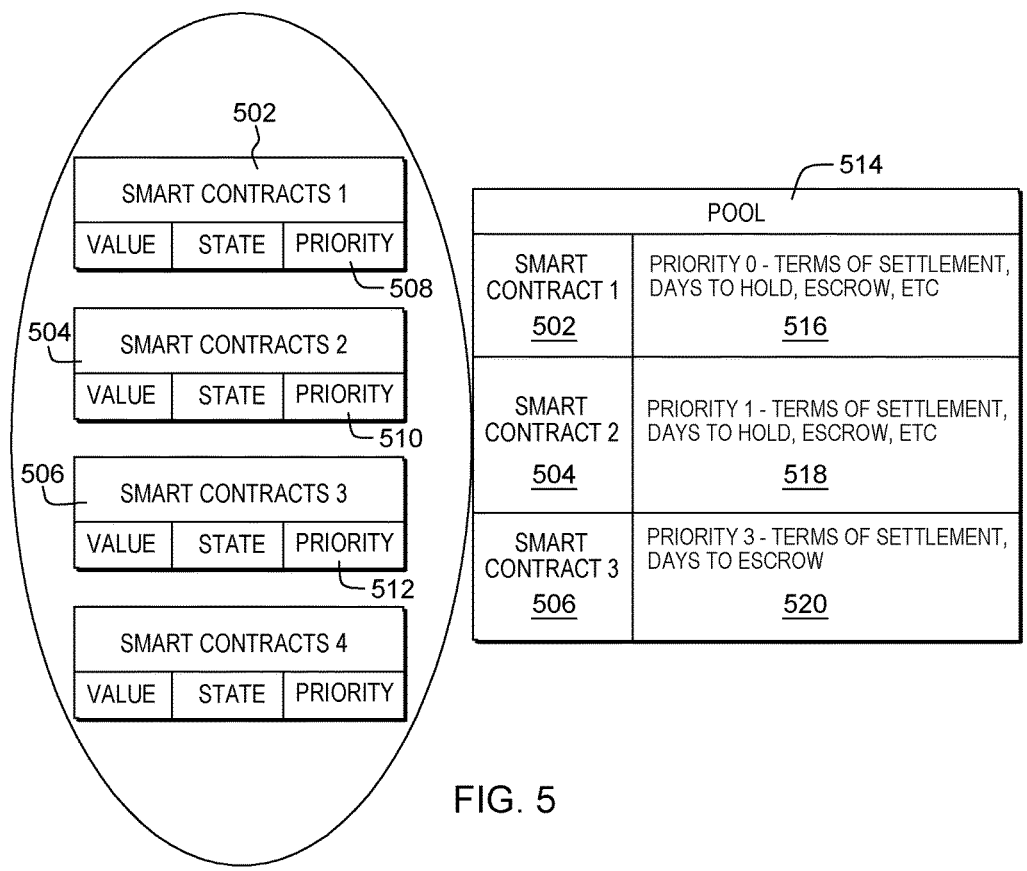
FIG. 5 is a diagram illustrating a pool of smart contracts in accordance with an embodiment of the present disclosure.

With reference now to FIG. 5, an example of a plurality of smart contracts having different priority levels is illustrated. For example, smart contracts 502, 504, and 506 each have a priority level 508, 510, 512, e.g., 0, 1, and 2 respectively. The priority level and term data associated with each smart contract, e.g., smart contracts 502, 504, and 506 may be stored in a pool 514, for example, as part of the ledger 204 (FIG. 2). Referring back to FIG. 1, in some aspects, the priority level and term data associated with each smart contract may be stored in a pool database 108 associated with blockchain 100. For example, pool database 108 may be stored in a decentralized manner in the memory 202 of one or more of nodes 200 or in memory of validator nodes 302. In some aspects, for example, pool 514 may store priority level and term data 516 associated with smart contract 502, e.g., a priority level of 0, terms of settlement, days to hold, escrow, etc. In some aspects, for example, pool 514 may store priority level and term data 518 associated with smart contract 504, e.g., a priority level of 1, terms of settlement, days to hold, escrow, etc. In some aspects, for example, pool 514 may store priority level and term data 520 associated with smart contract 506, e.g., a priority level of 3, terms of settlement, and days to escrow.

With reference again to FIG. 1, in some aspects, blockchain 100 may include a priority assignment subsystem 110. Priority assignment subsystem 110 is configured to assign priority levels to new transactions or smart contacts that are submitted for addition to blockchain 100. In some aspects, priority assignment subsystem 110 may be configured to receive a priority assignment for a new transaction or smart contract from a user, e.g., via a user interface. In some aspects, a new transaction or smart contract may be submitted with a predetermined priority level. In some aspects, when a new transaction or smart contract is submitted without a predetermined priority level, priority assignment subsystem 110 may assign a priority to the new transaction or smart contract. For example, in some aspects, priority assignment subsystem 110 may assign any new transactions or smart contracts with a default priority level. The default priority level may be set in advance, for example, in a prior transaction or smart contract that is already appended to the blockchain. For example, the default priority level may be set in a genesis, e.g., initial or first, block of the blockchain 100. In some aspects, the default priority level may be the lowest priority level. In some aspects, the default priority level may be determined by priority assignment subsystem 110 based on the type of transaction or smart contract, the business unit from which the transaction or smart contract has been received, or any other criteria. For example, a transaction or smart contract submitted by a primary business unit of the enterprise, e.g., corporate, legal, or other similar management or oversight business units, may have a default priority level that is higher than a transaction or smart contract submitted by a secondary business unit, e.g., sales, shipping and receiving, or other similar business units.

In some aspects, priority assignment subsystem 110 may be implemented on one or more of nodes 200 or validator nodes 302. For example, as new transactions or smart contracts are submitted to nodes 200 or validator nodes 302, nodes 200 or validator nodes 302 may implement priority assignment subsystem 110 to assign a priority level to the new transactions or smart contracts.

With continued reference to FIG. 1, in some aspects, blockchain 100 may include a priority examination subsystem 112. Priority examination subsystem 112 is configured to examine both new transactions and smart contracts submitted to the blockchain 100 and transactions and smart contracts that have already been appended to blockchain 100 to determine whether the terms overlap or conflict. In some aspects, for example, priority examination subsystem 112 may access the terms of transactions and smart contracts appended to blockchain 100 directly for comparison to the terms of a newly submitted transaction or smart contract. In some aspects, priority examination subsystem 112 may examine pool 508 to determine whether there are any conflicts or overlaps in terms. In some aspects, priority examination subsystem 112 may determine that there is an overlap or conflict when one or more terms are associated with the same entity, product, or other similar feature. For example, in some aspects, priority examination subsystem 112 may analyze the contents or terms of the transaction or smart contract, e.g., using a standard descriptive language, string matching, or other similar methods. In some aspects, priority examination subsystem 112 may categorize the transactions or smart contracts into one or more categories, for example, based on what master smart contract is controlling or other pre-defined categories of the blockchain. In some aspects, priority examination subsystem 112 may assess whether there is a conflict or overlap, for example, as described above. In some aspects, no examination of a transaction or smart contract already appended to the blockchain may need to be performed when the new transaction or smart contract has a higher priority than the already appended transaction or smart contract.

In some aspects, priority examination subsystem 112 may be implemented on one or more of nodes 200 or validator nodes 302. For example, as new transactions or smart contracts are submitted to nodes 200 or validator nodes 302, nodes 200 or validator nodes 302 may implement priority examination subsystem 112 to examine the terms of the new transactions or smart contracts and compare the terms to the terms of transactions or smart contracts that are already appended to blockchain 100.

With continued reference to FIG. 1, in some aspects, blockchain 100 may include a prioritization and resolution subsystem 114. Prioritization and resolution subsystem 114 is configured to resolve terms of a new transaction or smart contract against those terms identified by priority examination sub system 112 for transactions or smart contracts previously appended to blockchain 100 based on the relative priority of the transactions or smart contracts as assigned by priority assignment subsystem 110. For example, prioritization and resolution subsystem 114 may determine whether the new transaction or smart contract has a lower priority than a previously appended transaction or smart contract. If the new transaction or smart contract has a lower priority, prioritization and resolution subsystem 114 may determine whether there is a conflict or overlap based on the results output by priority examination sub system 112. If there is an overlap or conflict, some or all of the new transaction or smart contract may be denied by prioritization and resolution subsystem 114. For example, in some aspects, prioritization and resolution subsystem 114 may allow any terms of the new transaction or smart contract that do not overlap or conflict may to be appended to blockchain 100. As another example, in some aspects, prioritization and resolution subsystem 114 may not allow any of the terms of the new transaction or smart contract to be appended to blockchain 100 when there is an overlap or conflict.

In some aspects, prioritization and resolution subsystem 114 may be implemented on one or more of nodes 200 or validator nodes 302. For example, as new transactions or smart contracts are submitted to nodes 200 or validator nodes 302, nodes 200 or validator nodes 302 may implement prioritization and resolution subsystem 114 to resolve the terms identified by priority examination sub system 112 based on the priority level assigned by priority assignment subsystem 110.

Figure 6:
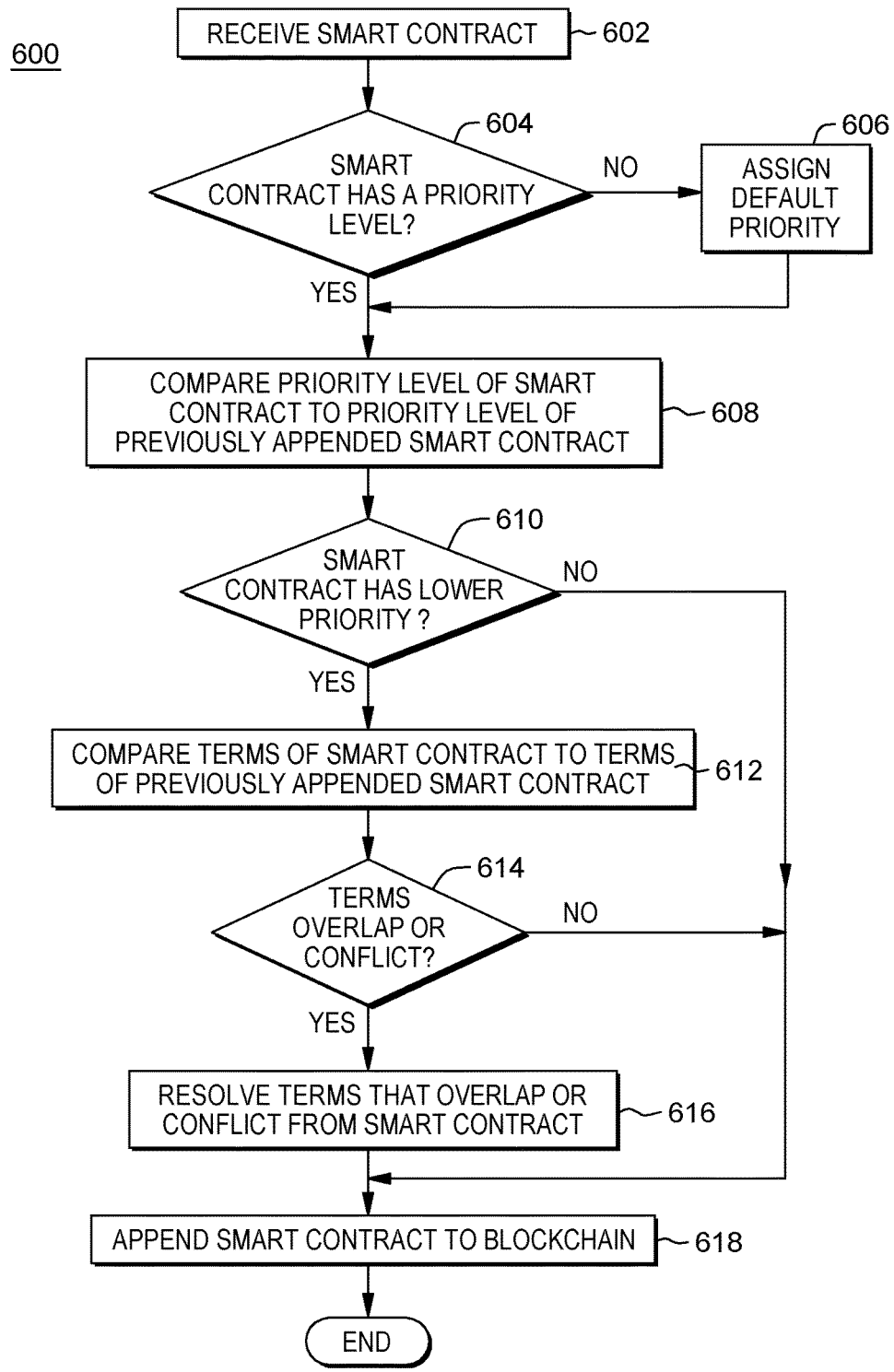
FIG. 6 is a flow chart of a method according to an embodiment of the present disclosure.

With reference now to FIG. 6, a method 600 for enforcing a smart contract execution hierarchy on a blockchain is disclosed. In some aspects, all or a portion of method 600 may be performed by various parts of the system including, for example, nodes 200, validator nodes 300, priority assignment subsystem 110, priority examination subsystem 112, prioritization and resolution subsystem 114, or any other portion of the system associated with blockchain 100.

At 602, a new smart contract is received, for example, by a validator node 302 or node 200 associated with blockchain 100.

At 604, priority assignment subsystem 110 determines whether the new smart contract has a priority level. If the new smart contract has a priority level, the method proceeds directly to 608.

If the new smart contract does not have a priority level, priority assignment subsystem 110 assigns a default priority level at 606, for example, in the manner as described above.

At 608, prioritization and resolution subsystem 114 may compare the priority level of the new smart contract to the priority level of a smart contract previously appended to the blockchain 100.

At 610, prioritization and resolution subsystem 114 may determine whether the new smart contract has a lower priority than the previously appended smart contract. If the prioritization and resolution subsystem 114 determines that the new smart contract does not have a lower priority, the method may proceed to 618.

If the prioritization and resolution subsystem 114 determines that the new smart contract has a lower priority than the previously appended smart contract, priority examination subsystem 112 may examine and compare the terms of the new smart contract and the previously appended smart contract at 612.

At 614, priority examination subsystem 112 may determine whether any of the terms of the new smart contract overlap or conflict with the terms of the previously appended smart contract. If the terms do not overlap or conflict, the method may proceed to 618.

If one or more of the terms do overlap or conflict, prioritization and resolution subsystem 114 may remove or modify the overlapping or conflicting terms from the new smart contract at 616.

At 618, the new smart contract is appended to the blockchain.

Figure 7:
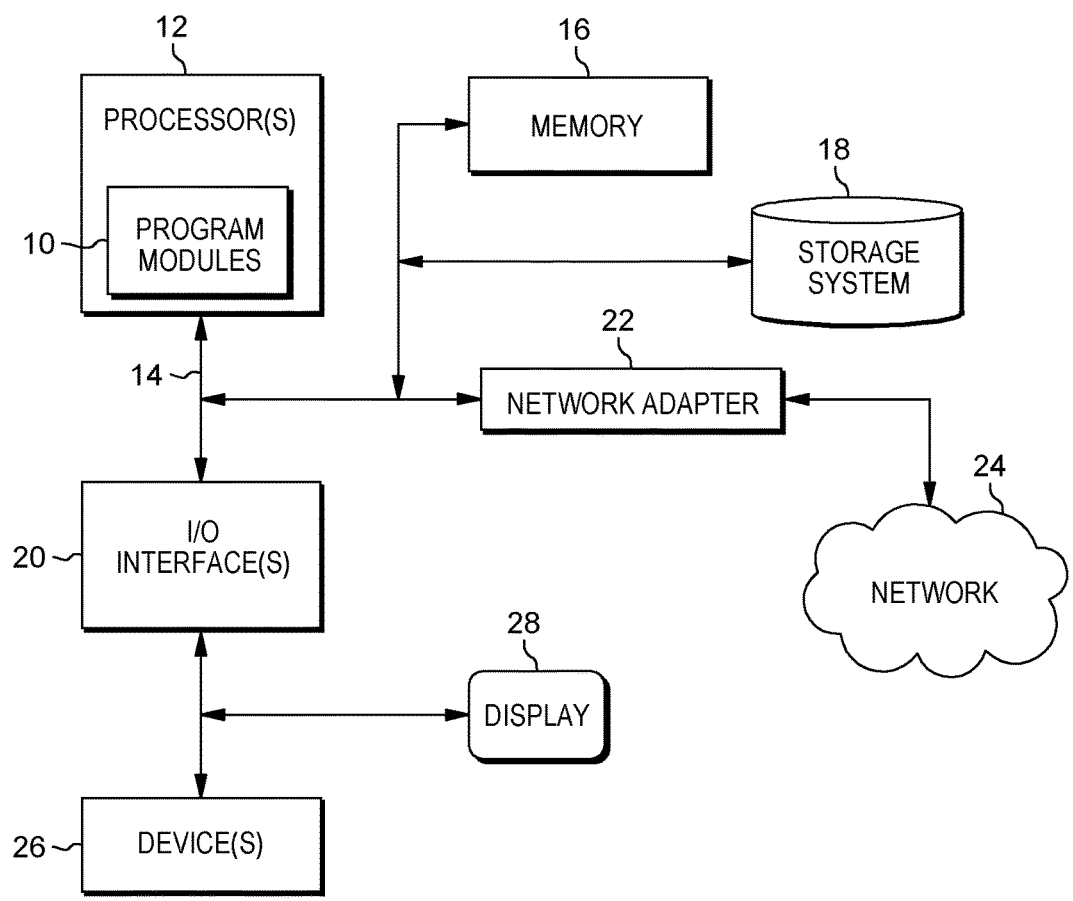
FIG. 7 is an exemplary block diagram of a computer system in which processes involved in the system, method, and computer program product described herein may be implemented.

FIG. 7 illustrates a schematic of an example computer or processing system that may implement any portion of blockchain 100, validators 200, nodes 300, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of enforcing a smart contract execution hierarchy on a blockchain implemented by at least one hardware processor associated with one or more validator nodes of multiple computing nodes, the method comprising:

receiving, at the at least one hardware processor associated with said one or more validator nodes, a second smart contract for storage at a distributed ledger of the blockchain, said second smart contract governing a compliance of all new transactions and smart contracts entered into by a same entity that are subsequently submitted to the ledger for appending to the blockchain;

receiving, at the at least one hardware processor associated with said one or more validator nodes, over a respective communications network connection, a submission of a first smart contract to be deployed at the distributed ledger, the distributed ledger comprising a database shared by the multiple computing nodes participating in a system based on a blockchain protocol;

determining, by said at least one hardware processor, a priority level associated with said first smart contract to be deployed; and assigning, by a priority assignment system associated with said distributed ledger, a priority value to said first smart contract in response to determining no priority level is associated with the first smart contract;

determining, by said at least one hardware processor at the one or more validator nodes, in response to the received first smart contract submission, whether said first smart contract references the second smart contract previously stored on said ledger of the blockchain;

comparing, by said at least one hardware processor at the one or more validator nodes, in response to the determining of a reference to the second smart contract, the corresponding priority value of the first smart contract to a value corresponding to a priority of the second smart contract previously appended to the blockchain;

determining, by said hardware processor, based on the comparison that the first smart contract has a lower priority than the second smart contract;

in response to determining that the first smart contract has a lower priority than the second smart contract, performing, by at least one hardware processor at said one or more validator nodes, a string matching analysis, a syntax analysis or both a string matching and syntax analyses for comparing on said blockchain the terms of the first smart contract to terms of the second smart contract;

determining on said blockchain, by said at least one hardware processor running at the one or more validator nodes, at least one of an overlap and a conflict between the terms of the first smart contract and the terms of the second smart contract based on the string matching, syntax analysis or both the string matching and syntax analysis comparison;

resolving on said blockchain, by said at least one hardware processor at the one or more validator nodes, any terms of the first smart contract that are determined to overlap or conflict with the terms of the second smart contract, said resolving comprising at least one of: removing terms from the first smart contract that are determined overlap or conflict and modifying terms of the first smart contract that are determined to overlap or conflict;

packaging, using said at least one hardware processor, said resolved first smart contract into a new data block;

sharing, by said at least one hardware processor, among the validator nodes associated with the blockchain, the new data block by transmitting and receiving consensus messages via communication network connections;

voting, by said at least one hardware processor at each respective validator nodes associated with the blockchain, whether to add the new block to the blockchain;

determining, by said at least one hardware processor at the one or more validator nodes, in response to the voting, that a consensus is reached among said validator nodes to append the new data block to said blockchain; and in response to reaching the consensus, appending, by the at least one hardware processor, the new data block comprising said resolved first smart contract to the ledger of the blockchain, and prior to the appending the new data block comprising said resolved first contract to the ledger of the blockchain:
  comparing, by the at least one hardware processor, the terms of at least a third smart contract that is already appended to the blockchain that has a lower priority than the second smart contract to the terms of the second smart contract;
  determining, by the at least one hardware processor, that the at least a third smart contract includes a term that does not overlap or conflict with the terms of the second smart contract based on the comparison of the terms of the at least a third smart contract with the terms of the second smart contract;
  comparing, by the at least one hardware processor, a combination of a term of the first smart contract that is determined to not overlap or conflict with the terms of the second smart contract and the term of the at least a third smart contract that is determined to not overlap or conflict with the terms of the second smart contract to the terms of the second smart contract;
  determining, by the at least one hardware processor, at least one of an overlap and a conflict between the combined terms of the first smart contract and the at least a third smart contract and the terms of the second smart contract based on the comparison of the combination of the terms with the terms of the second smart contract; and
  removing, by the at least one hardware processor, the term from the first smart contract that is determined to at least one of overlap and conflict with the terms of the second smart contract when combined with the term of the at least a third smart contract; and executing, by said at least one hardware processor, said terms of said first contract and said second contract according to a hierarchy based on said priority, wherein only terms of said first contract that are non-overlapping or non-conflicting with terms of said second contract are executed; wherein said method further comprises:
  storing, at a pool database associated with said one or more validator nodes, smart contracts, priorities and terms; and said comparing on said blockchain the combination of a term of the first smart contract and the term of the at least third smart contract further comprising:
  examining, by said at least one hardware processor, said priorities, terms and smart contracts stored at said pool database and comparing terms of newly received contracts or transactions against each deployed contracts having a higher priority entered into by the same entity, and resolving conflicts of said newly received contracts or transactions with said deployed contracts having said higher priority.

2. The computer-implemented method of claim 1, wherein the terms of the second smart contract include at least one law and the determination of whether there is at least one of an overlap and a conflict between the terms of the first smart contract and the terms of the second smart contract includes determining, by the at least one hardware processor, whether the terms of the first smart contract violate the at least one law.

3. The computer-implemented method of claim 1, further comprising:
  comparing, by the at least one hardware processor, the value of the first smart contract to a value corresponding to a priority of a fourth smart contract previously appended to the blockchain;
  determining, by the at least one hardware processor, based on the comparison that the first smart contract has the same priority as the fourth smart contract;
  comparing, by the at least one hardware processor, the terms of the first smart contract to the terms of the fourth smart contract;
  determining at least one of an overlap and a conflict between the terms of the first smart contract and the terms of the fourth smart contract based on the comparison of the terms of the first smart contract to the terms of the fourth smart contract;
  resolving, by the at least one hardware processor, any terms from the first smart contract that are determined overlap or conflict with the terms of the fourth smart contract prior to appending the new smart contract to the blockchain.

4. A system for enforcing a smart contract execution hierarchy on a blockchain, said system comprising:
  multiple computing nodes, said multiple computing nodes comprising one or more validator nodes;
  a distributed blockchain ledger database shared by the multiple validator nodes, the distributed blockchain ledger database recording transactions submitted by said multiple computing nodes according to a blockchain protocol;
  a validator node further comprising at least one hardware processor and a computer readable storage memory having instructions stored thereon that, when executed by the at least one hardware processor, cause the validator node to perform a method comprising:
    receiving a second smart contract for storage at the distributed ledger of the blockchain, said second smart contract governing a compliance of all new transactions and smart contracts entered into by a same entity that are subsequently submitted to the ledger for appending to the blockchain;

receiving, over a communications network connection, a submission of a first smart contract to be deployed at the distributed blockchain ledger;

determining, by said at least one hardware processor, a priority level associated with said first smart contract to be deployed; and assigning, by a priority assignment system associated with said distributed ledger, a priority value to said first smart contract in response to determining no priority level is associated with the first smart contract;

determining, in response to the received first smart contract submission, whether said first smart contract references the second contract previously stored on said distributed ledger of the blockchain;

comparing, in response to the determining of a reference to the second smart contract, the corresponding priority value of the first smart contract to a value corresponding to a priority of a second smart contract previously appended to the blockchain;

determining based on the comparison that the first smart contract has a lower priority than the second smart contract;

in response to determining that the first smart contract has a lower priority than the second smart contract, performing a string matching analysis, a syntax analysis or both a string matching and syntax analyses for comparing on said blockchain the terms of the first smart contract to terms of the second smart contract;

determining on said blockchain at least one of an overlap and a conflict between the terms of the first smart contract and the terms of the second smart contract based on the string matching, syntax analysis or both the string matching and syntax analyses comparison;

resolving on said blockchain any terms of the first smart contract that are determined to overlap or conflict with the terms of the second smart contract, said resolving comprising at least one of removing terms from the first smart contract that are determined overlap or conflict and modifying terms of the first smart contract that are determined to overlap or conflict;

packaging, using said at least one hardware processor, said resolved first smart contract into a new data block;

sharing, among the validator nodes associated with the blockchain, the new data block by transmitting and receiving consensus messages via communication network connections;

voting, by the respective validator nodes associated with the blockchain, whether to add the new block to the blockchain;

determining, in response to the voting, that a consensus is reached among said validator nodes to append the new data block to said blockchain; and in response to reaching the consensus comprising said validation, appending the new data block comprising said resolved first smart contract to the ledger of the blockchain, and prior to the appending the new data block comprising said resolved first contract to the ledger of the blockchain:

comparing, by the at least one hardware processor, the terms of at least a third smart contract that is already appended to the blockchain that has a lower priority than the second smart contract to the terms of the second smart contract;

determining, by the at least one hardware processor, that the at least a third smart contract includes a term that does not overlap or conflict with the terms of the second smart contract based on the comparison of the terms of the at least a third smart contract with the terms of the second smart contract;

comparing, by the at least one hardware processor, a combination of a term of the first smart contract that is determined to not overlap or conflict with the terms of the second smart contract and the term of the at least a third smart contract that is determined to not overlap or conflict with the terms of the second smart contract to the terms of the second smart contract;

determining, by the at least one hardware processor, at least one of an overlap and a conflict between the combined terms of the first smart contract and the at least a third smart contract and the terms of the second smart contract based on the comparison of the combination of the terms with the terms of the second smart contract; and removing, by the at least one hardware processor, the term from the first smart contract that is determined to at least one of overlap and conflict with the terms of the second smart contract when combined with the term of the at least a third smart contract; and executing said terms of said first contract and said second contract according to a hierarchy based on said priority, wherein only terms of said first contract that are non-overlapping or non-conflicting with terms of said second contract are executed; wherein said system further comprises:

a pool database associated with the one or more validator nodes for storing smart contracts, priorities and terms; and to compare on said blockchain the combination of a term of the first smart contract and the term of the at least third smart contract, said at least one hardware processor further configured to: examine said priorities, terms and smart contracts stored at said pool database and comparing terms of newly received contracts or transactions against each deployed contracts having a higher priority entered into by the same entity, and resolving conflicts of said newly received contracts or transactions with said deployed contracts having said higher priority.

5. The system of claim 4, wherein the terms of the second smart contract include at least one law and the determination of whether there is at least one of an overlap and a conflict between the terms of the first smart contract and the terms of the second smart contract includes determining whether the terms of the first smart contract violate the at least one law.

6. The system of claim 4, the at least one hardware processor further:

comparing the value of the first smart contract to a value corresponding to a priority of a fourth smart contract previously appended to the blockchain;

determining based on the comparison that the first smart contract has the same priority as the fourth smart contract;

comparing the terms of the first smart contract to the terms of the fourth smart contract;

determining at least one of an overlap and a conflict between the terms of the first smart contract and the terms of the fourth smart contract based on the comparison of the terms of the first smart contract to the terms of the fourth smart contract;

resolving any terms from the first smart contract that are determined overlap or conflict with the terms of the fourth smart contract prior to appending the new smart contract to the blockchain.

7. A computer program product comprising a non-transitory computer readable medium storing instructions that, when executed by at least one hardware processor of a computing node, cause the computing node to perform operations for enforcing a smart contract execution hierarchy on a blockchain, the operations comprising:

receiving a second smart contract for storage at a distributed ledger database of the blockchain, said second smart contract governing a compliance of all new transactions and smart contracts entered into by a same entity that are subsequently submitted to the ledger for appending to the blockchain;

receiving over a communications network connection, a submission of a first smart contract to be deployed at the distributed ledger database according to a blockchain protocol;

determining, by said at least one hardware processor, a priority level associated with said first smart contract to be deployed; and assigning, by a priority assignment system associated with said distributed ledger, a priority value to said first smart contract in response to determining no priority level is associated with the first smart contract;

determining, in response to the received first smart contract submission, whether said first smart contract references a second contract stored on said ledger of the blockchain;

comparing, in response to the determining of a reference to the second smart contract, the corresponding priority value of the first smart contract to a value corresponding to a priority of a second smart contract previously appended to the blockchain;

determining based on the comparison that the first smart contract has a lower priority than the second smart contract;

in response to determining that the first smart contract has a lower priority than the second smart contract, performing a string matching analysis, a syntax analysis or both a string matching and syntax analyses for comparing on said blockchain the terms of the first smart contract to terms of the second smart contract;

determining on said blockchain at least one of an overlap and a conflict between the terms of the first smart contract and the terms of the second smart contract based on the string matching, syntax analysis or both the string matching and syntax analyses comparison;

resolving on said blockchain any terms of the first smart contract that are determined to overlap or conflict with the terms of the second smart contract, said resolving comprising at least one of removing terms from the first smart contract that are determined overlap or conflict and modifying terms of the first smart contract that are determined to overlap or conflict; and packaging, using said at least one hardware processor, said resolved first smart contract into a new data block;

sharing, among the validator nodes associated with the blockchain, the new data block by transmitting and receiving consensus messages via communication network connections;

voting, by the respective validator nodes associated with the blockchain, whether to add the new block to the blockchain;

determining in response to the voting, that a consensus is reached to append the new data block to said blockchain; and in response to reaching the consensus, appending the new data block comprising said resolved first smart contract to the blockchain, and prior to the appending the new data block comprising said resolved first contract to the ledger of the blockchain:

comparing, by the at least one hardware processor, the terms of at least a third smart contract that is already appended to the blockchain that has a lower priority than the second smart contract to the terms of the second smart contract;

determining, by the at least one hardware processor, that the at least a third smart contract includes a term that does not overlap or conflict with the terms of the second smart contract based on the comparison of the terms of the at least a third smart contract with the terms of the second smart contract;

comparing, by the at least one hardware processor, a combination of a term of the first smart contract that is determined to not overlap or conflict with the terms of the second smart contract and the term of the at least a third smart contract that is determined to not overlap or conflict with the terms of the second smart contract to the terms of the second smart contract;

determining, by the at least one hardware processor, at least one of an overlap and a conflict between the combined terms of the first smart contract and the at least a third smart contract and the terms of the second smart contract based on the comparison of the combination of the terms with the terms of the second smart contract; and removing, by the at least one hardware processor, the term from the first smart contract that is determined to at least one of overlap and conflict with the terms of the second smart contract when combined with the term of the at least a third smart contract; and executing said terms of said first contract and said second contract according to a hierarchy based on said priority, wherein only terms of said first contract that are non-overlapping or non-conflicting with terms of said second contract are executed; wherein the operations further comprise:

storing, at a pool database associated with the one or more validator nodes, smart contracts, priorities and terms; and the comparing on said blockchain the combination of a term of the first smart contract and the term of the at least third smart contract further comprising;

examining said priorities, terms and smart contracts of said pool database and comparing terms of newly received contracts or transactions against each deployed contracts having a higher priority entered into by the same entity, and resolving conflicts of said newly received contracts or transactions with said deployed contracts having said higher priority.

8. The non-transitory computer readable medium of claim 7, wherein the terms of the second smart contract include at least one law and the determination of whether there is at least one of an overlap and a conflict between the terms of the first smart contract and the terms of the second smart contract includes determining whether the terms of the first smart contract violate the at least one law.

9. The non-transitory computer readable medium of claim 7, the instructions further causing the at least one hardware processor to:
compare the value of the first smart contract to a value corresponding to a priority of a fourth smart contract previously appended to the blockchain;
determine based on the comparison that the first smart contract has the same priority as the fourth smart contract;
compare the terms of the first smart contract to the terms of the fourth smart contract;
determine at least one of an overlap and a conflict between the terms of the first smart contract and the terms of the fourth smart contract based on the comparison of the terms of the first smart contract to the terms of the fourth smart contract;
resolve any terms from the first smart contract that are determined overlap or conflict with the terms of the fourth smart contract prior to appending the new smart contract to the blockchain.

10. The computer-implemented method of claim 1, wherein said assigning, by a priority assignment system associated with said distributed ledger, a priority value to said first smart contract comprises one of: a predetermined default priority level or a priority level based on a predetermined criteria.

11. The computer-implemented method of claim 10, wherein said predetermined criteria for basing a priority level comprises: a type of transaction or first smart contract being received, or a particular business unit from which said first smart contract is being received.

12. The computer-implemented method of claim 10, wherein priority assignment system comprises: a user interface configured to receive a priority value for assignment to a new transaction or smart contract from a user.

13. The computer-implemented method of claim 1, further comprising: receiving at the first smart contract a priority assignment value from another smart contract saved to said distributed ledger associated with a prior transaction.

14. The system of claim 4, wherein said assigning, by a priority assignment system associated with said distributed ledger, a priority value to said first smart contract comprises one of: a predetermined default priority level or a priority level based on a predetermined criteria.

15. The system of claim 14, wherein said predetermined criteria for basing a priority level comprises: a type of transaction or first smart contract being received, or a particular business unit from which said first smart contract is being received.

16. The system of claim 14, wherein priority assignment system comprises: a user interface configured to receive a priority value for assignment to a new transaction or smart contract from a user.

17. The system of claim 4, further comprising: receiving at the first smart contract a priority assignment value from another smart contract saved to said distributed ledger associated with a prior transaction.

* * * * *